United States Patent [19]

Moricca et al.

[11] 4,119,811

[45] Oct. 10, 1978

[54] PHOTO-VIBRATORY TRANSDUCER

[75] Inventors: Larry S. Moricca, Churubusco; Joseph G. Utasi, Fort Wayne, both of Ind.

[73] Assignee: Anthony C. Moricca, Fort Wayne, Ind.

[21] Appl. No.: 784,286

[22] Filed: Apr. 4, 1977

[51] Int. Cl.² .................. G09B 21/00; G06K 7/14
[52] U.S. Cl. .................. 340/407; 35/35 A; 179/91 R; 250/239; 340/321
[58] Field of Search ........... 179/91 R, 2 R; 35/35 A, 35/35 C, DIG. 2; 235/61.11 E, 454; 340/332, 337, 366 D, 381, 407, 228 S, 321; 250/215, 239

[56] References Cited

U.S. PATENT DOCUMENTS

| | | | |
|---|---|---|---|
| 3,229,075 | 1/1966 | Palti | 35/35 A |
| 3,229,387 | 1/1966 | Linvill | 35/35 A |
| 3,234,337 | 2/1966 | Schuyler | 179/91 R |
| 3,359,425 | 12/1967 | Smith | 35/35 A |
| 3,369,228 | 2/1968 | Foster | 340/228 R |
| 3,416,241 | 12/1968 | Weitzner | 35/35 C |
| 3,541,706 | 11/1970 | Shapiro | 35/38 |
| 3,758,782 | 9/1973 | Radford et al. | 250/239 |
| 3,826,900 | 7/1974 | Moellering | 235/61.11 E |
| 3,874,097 | 4/1975 | Mauch et al. | 35/35 A |
| 3,892,974 | 7/1975 | Ellefson et al. | 235/61.11 E |

FOREIGN PATENT DOCUMENTS 1,254,391 11/1967 Fed. Rep. of Germany .......... 35/35 A

OTHER PUBLICATIONS

"Bell System Aid to the Blind"; Bell Labs. Record; Jan. 1957; pp. 30 and 31.

Primary Examiner—Kathleen H. Claffy
Assistant Examiner—Randall P. Myers
Attorney, Agent, or Firm—Gust, Irish, Jeffers & Rickert

[57] ABSTRACT

An elongated manually manipulable housing contains a photocell at one end for sensing energy levels in the visible frequency spectrum causing said photocell to correspondingly change in electrical conductivity. A portable power source in the housing is coupled to the photocell to provide an electrical signal corresponding to the change in the photocell conductivity. A comparator circuit in the housing compares that signal with an adjustable reference signal to provide an output signal upon a predetermined ratio between the compared signals. A multivibrator circuit in said housing is coupled to said comparator circuit and to a vibration-generating means which produces signals preferably in the audible range, so that upon the occurrence of an output signal, a user discernible, either audible or tactile, vibratory signal is generated.

4 Claims, 7 Drawing Figures

U.S. Patent
Oct. 10, 1978
4,119,811
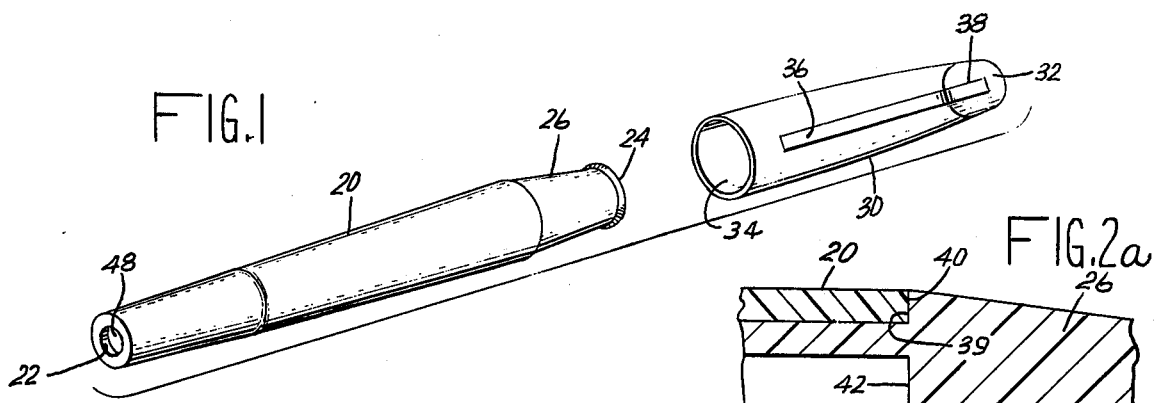
FIG. 1
FIG. 2a
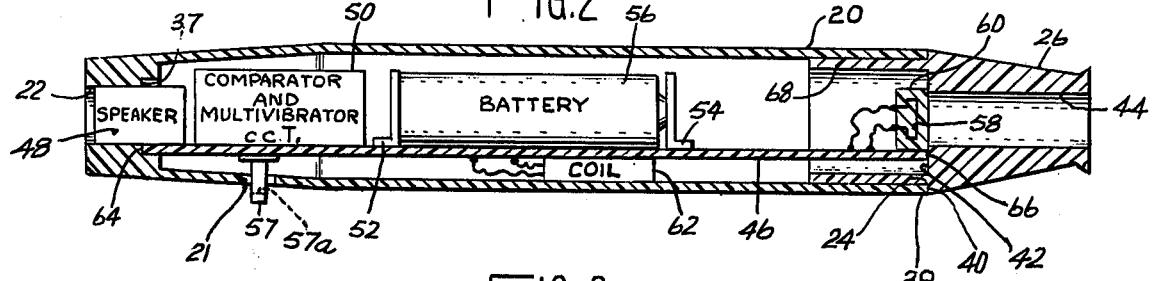
FIG. 2
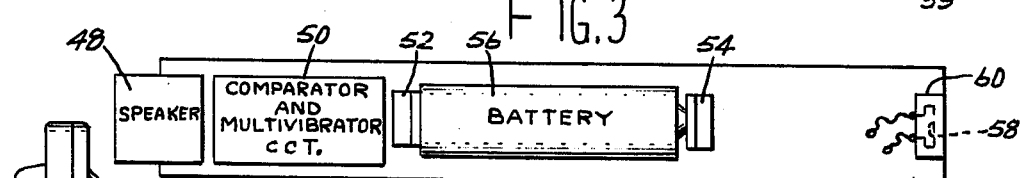
FIG. 3
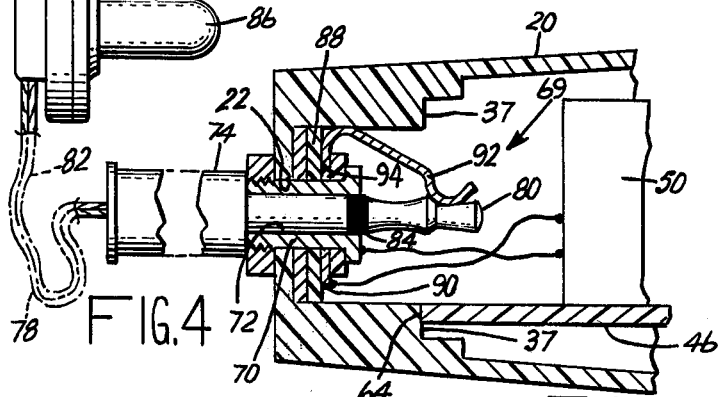
FIG. 4
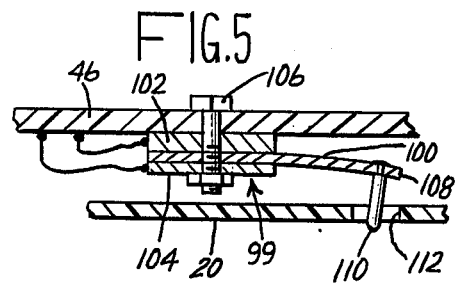
FIG. 5
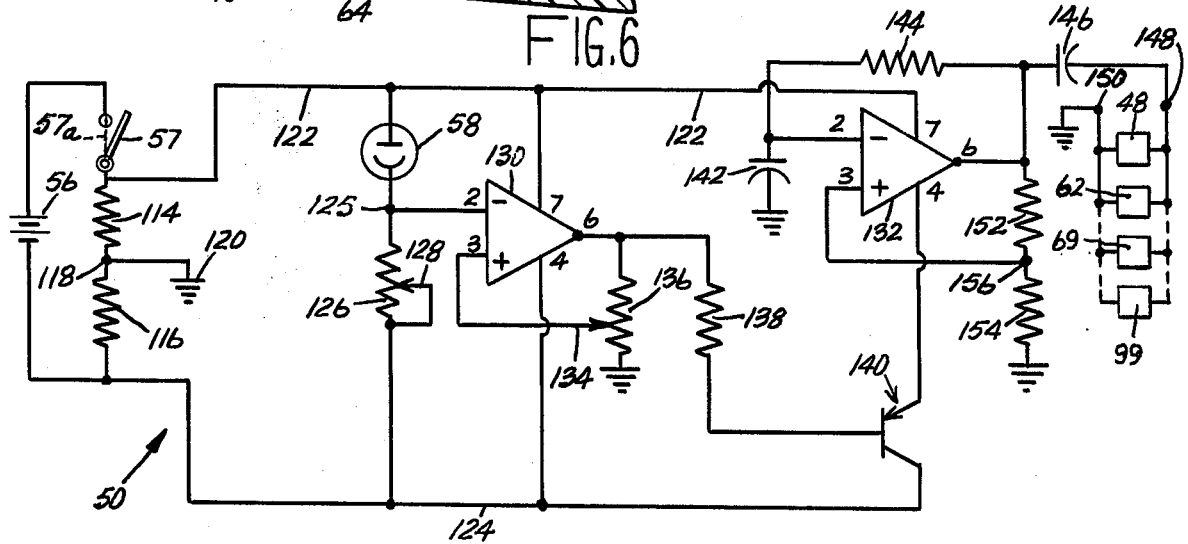
FIG. 6

PHOTO-VIBRATORY TRANSDUCER

BACKGROUND OF THE INVENTION

1. Field of the Invention

This invention is in the field of photo-vibratory transducers and more particularly to a transducer which is self-contained and relatively small so that it is finger-manipulable and finger supportable by a blind person for use as a telephone answering aid.

2. Description of the Prior Art

Numerous aids have been developed over the years for aiding blind persons in telephone answering service. A blind person is able to perform telephone answering functions if provided with a transducer which may be easily used to sense and distinguish between light signals generated in a line selector pushbutton of a conventional multi-line desk telephone indicative of telephone "ringing", "hold", and "busy" signals. In the past, such devices have been provided in various forms and in various combinations, but in general have been limited in use due to their incorporation in non-portable systems and in systems involving the complexity of a switchboard or the like. A need for a completely self-contained finger manipulable and supportable transducer has existed in order that blind persons may operate any conventional desk telephone having a plurality of lighted buttons in order quickly and easily to determine a lighted condition in any of the buttons and to distinguish between different flashing conditions. The need for providing in such a device portability such that the device may be conveniently carried in a shirt or a coat pocket and having low power drain and resultant battery longevity has also existed.

SUMMARY OF THE INVENTION

An elongated housing, which is dimensioned to be worn or carried on a person, receives an elongated circuit board which has a photocell or other light sensitive devices, attached at one end. The photocell responds to ambient light levels by changing its conductivity correspondingly. A power source, such as a commercially available low voltage cell, is mounted on the circuit board in electrical contact with the photocell device. A comparator circuit, a multivibrator circuit and a sensory device for emitting an audible and/or tactilely discernible signal are mounted in longitudinal alignment on the board. The comparator circuit has an input circuit coupled to the photocell and power source and an output circuit coupled to the multivibrator circuit. The multivibrator circuit is coupled to the sensory device. Upon a change of state of the photocell in response to changing light levels, the comparator receives a corresponding change in electrical signal which it compares to a predetermined signal and once a predetermined ratio between the signals occurs, the comparator generates a signal which is applied to the multivibrator circuit, causing an output signal to be generated to energize the sensory device. Thus, upon reception of a light signal of a given energy level, the sensory device will be vibrated at an audible and/or tactile frequency so that the user can hear and/or feel the response. The resulting instrument is sufficiently small and light in weight to be quickly and easily manipulated to scan the luminescent button of a standard multi-line desk telephone whereby the lighted condition of the buttons may be readily ascertained.

This invention makes use of commercially available general purpose operational amplifiers for both the comparator and multivibrator circuits. Battery drain is kept at low level resulting in correspondingly long battery life. The audible sensory device may be a crystal type loud speaker mounted in the housing or a conventional earphone separate from the housing. The tactile sensory device may be a piezoelectric crystal or a relay which will vibrate at the multivibrator frequency. Thus, this invention may be used with or without an earphone to audibly signal the lighted or flashing condition of the telephone buttons and may also be provided with a tactilely sensible member. The instrument is of such size as to be conveniently carried by the user.

It is therefore an object of this invention to provide a relatively low cost photo-vibratory transducer which is self-contained, sufficiently compact to be finger manipulable and to be worn on the user's person.

It is a further object of this invention to provide in a device of the foregoing object, circuitry having low power consumption and relatively long battery life.

An additional object is to provide a portable transducer which can sense a given level of ambient light and provide an audible and/or tactile responsive thereto signal.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a partially exploded view in perspective of an embodiment of this invention;

FIG. 2 is a partially diagrammatic longitudinal sectional view of the embodiment of FIG. 1;

FIG. 2a is an enlarged view of a portion of FIG. 2;

FIG. 3 is a top plan view of the printed circuit board used in the embodiment of FIG. 2 with the comparator and multivibrator circuits, photocell, and speaker diagrammatically shown mounted thereon;

FIG. 4 is an enlarged partial longitudinal section of a second embodiment of this invention;

FIG. 5 is an enlarged partial longitudinal section of a third embodiment of this invention; and FIG. 6 is a schematic diagram of a circuit of this invention.

DESCRIPTION OF THE PREFERRED EMBODIMENT

Referring to FIGS. 1, 2, and 2a of the drawing, an elongated tubular housing 20, which may be of molded plastic material, has an opening 22 at one end and an opening 24 at the other end for receiving in sliding frictional engagement a tubular end piece 26 which also may be of molded plastic material. A tubular cap 30 having a closed end 32 and an open end 34, is provided with a resilient pocket clip 36 secured at 38. Opening 34 frictionally receives end piece 26 of housing 20 to provide a pencil-like instrument that may be conveniently worn or carried on the user's person, such as in a coat or shirt pocket.

Housing 20 has an internally formed annular shoulder 37 formed adjacent opening 22 at the other end, housing 20 frictionally receives within opening 24 a tubular end piece 26. This end piece 26 is provided with a first radial shoulder 39 that abuts the end of housing 20 and a second radial shoulder 42 which surrounds the inner end of light-receiving passage 44 which preferably is of uniform diameter.

Referring to FIG. 3, an elongated relatively stiff circuit board 46 of insulative material has mounted thereon a small crystal type loud speaker 48, a comparator and multivibrator circuit 50, and longitudinally spaced battery brackets 52 and 54 of resilient metal which hold a battery 56 therebetween. Photocell 58 is embedded within a block of plastic insulation, such as nylon, which in turn is cemented or otherwise securely fastened to the upper surface of one end of board 46. Fastened to the underside of board 46 is an electric relay coil 62 which, as will become apparent, is adapted for operative engagement with the inner wall of housing 20 to cause the latter to vibrate. It is to be understood that speaker 48, circuit 50, brackets 52 and 54, photocell 58, and relay 62, are electrically connected as shown in FIG. 6, later described, by conductive lines printed on board 46 in a manner well known to the art.

Board 46 is longitudinally inserted into housing 20 when end piece 26 is removed, until the end of board 46 abuts shoulder 37, after which end piece 26 is inserted into opening 24 of housing 20 until shoulder 39 abuts end 40. End 66 of board 46 abuts shoulder 42 thus longitudinally locating board 46 in housing 20. Also, the bottom surface of board 46 is supported at its opposite longitudinal edges on the inner surface of the tubular section 68 of end piece 26. When so inserted, it is seen that speaker 48 is aligned with and extends through opening 22 at one end of housing 20 and photocell 58 is aligned with window or passage 44. Passage 44 is adapted to receive illumination therethrough, such as would be the case when it is registered with a lighted line selector button on a multi-line desk telephone, not shown.

A bistable pushbutton switch 57 is affixed to the lower side of board 46 and extends through opening 21 in housing 20. Thus switch 57 is manually operable to closed position 57a and alternatively to open position 57, and may be of a conventional commercially available type. Any other two position, "on-off" switch may be used.

In an alternative embodiment shown in FIG. 4, speaker 48 is replaced with an earphone jack 69 mounted near and 64 on the upper surface of board 46. The jack 69 is of conventional design having a barrel 70 provided with plug-receiving bore 72. An earphone plug 74 of conventional design is removably inserted into bore 72 and has two earphone wires 78 and 82 connected thereto. An earphone 86 is connected to wires 78 and 82. An insulative washer 88 is attached to an end of barrel 70 and a conductive ring 90 having a resilient curved conductive finger 92 extending therefrom is placed against washer 88. A second insulative washer 94 is placed against ring 90 and is securely held thereagainst. Finger 92 bears against electrode 80 a plug 74 in electrical contact therewith and to mechanically hold pin 74 in bore 72. Bore 72 and ring 90 are electrically connected to the output of circuit 50 by means of printed conductive lines on board 46 in the manner shown in the schematic of FIG. 6. Thus, an earphone may be used for those applications of this invention wherein a speaker sound may be distracting to others.

A further modification is shown in FIG. 5 wherein relay coil 62 (FIG. 2) may be replaced by a piezoelectric blade 100 which is sandwiched between two electrical plates 102 and 104 which are in contact with opposite surfaces thereof and which are secured to the under surface of circuit board 46 by means of a threaded fastener 106. Blade 100 has on its outer end 108 a transverse pin 110 which extends through an opening 112 in the wall of housing 20 and when energized by the circuit of FIG. 6, blade 100 will cause a rapid vibration if pin 110 against the user's hand to provide a tactile recognition of an output signal. Plates 102 and 104 are electrically connected to printed, output circuit lines on board 46.

The circuit for providing a signal to speaker 48, relay 62, earphone 86, and blade 100, upon incident illumination on photocell 58 will now be described in reference to the schematic diagram of FIG. 6. Battery 56, which may be a 15 volt, pen light size, Eveready battery 504 has its positive terminal connected through switch 57, when in the closed position 57a, and to its negative terminal through series connected resistors 114 and 116. The juncture 118 between resistors 14 and 116 is connected to ground 120 thereby resulting in the application of positive and negative potential to lines 122 and 124, respectively. Photocell 58, which may be an NSL-3122 cadmium selenide photocell from NSL Opto-Electronic, Inc., lhas one terminal connected to line 122 and the other terminal connected through junction 125 and potentiometer 126, 128 to line 124.

Integrated circuit, operational amplifiers 130 and 132 each may be an LM307 available from National Semiconductor, Inc., and described in their 1976 Linear Data Book on pages 3-110 to 3-113 and have a pin 2 which is an inverting input terminal; a pin 3 which is a non-inverting input terminal; pin 4 which is a minus voltage input terminal; pin 6 which is an output terminal; and pin 7 which is a plus voltage input terminal. Amplifier 130, as will become apparent, is connected as a comparator, and has pin 2 connected to junction 125 between photocell 58 and potentiometer 126, pin 3 connected to slider 134 of a potentiometer 136. Potentiometer 136 has one end connected to pin 6 and the other end grounded. Pin 4 is connected to line 124, and pin 7 connected to line 122. Amplifier 132 is identical to amplifier 130, and is connected as a free running multivibrator. Pin 6 of amplifier 130 is connected through a resistance 138 to the base of a PNP transistor 140, which may be a 2N3906, having its collector connected to line 124 and its emitter connected to pin 4 of amplifier 132. Pin 2 of amplifier 132 is connected to one terminal of a capacitor 142, which has its other terminal connected to ground. A resistor 144 is connected between capacitors 142 and 146. An output terminal 148 connects to capacitor 146 and pin 6 of amplifier 132. The other output terminal 150 is connected to ground. For the embodiment of FIG. 2, speaker 48 and coil 62 are connected between output terminals 148 and 150, and for the embodiments of FIGS. 4 and 5, earphone assembly 69 and piezoelectric assembly 99 respectively would be connected between terminals 148 and 150. Pin 16 of amplifier 132 is connected through resistors 152 and 154 to ground and pin 3 of amplifier 132 is connected to a juncture 156 between resistors 152 and 154.

In the operation of circuit of FIG. 6, switch 57 is closed thus placing a positive voltage, such as plus 7.5 volts on line 122, and a negative voltage, such as minus 7.5 volts on line 124. Housing 120 is then manipulated by the user to scan the line selection buttons of a standard multi-line desk telephone and when a lighted button becomes aligned with window 44, the resistance in photocell 58 decreases thus raising the voltage at junction 125 and at pin 2 of amplifier 130. The output signal at pin 6 of amplifier 130 swings from a plus 7.5 volts to a minus 7.5 volts when the voltage at pin 2 is more positive than the voltage at pin 3. The voltage at pin 3 may be adjusted by moving slider 134 and thus, as will become apparent, provides an adjustment for determining the energy level of the light incident upon photocell 58 which will cause an output signal at terminal 148. Thus when the voltage at pin 2 is in a predetermined ratio with and exceeds the adjustable predetermined voltage at pin 3, the voltage at output pin 6 of amplifier 130 will change from a plus 7.5 volts to a minus 7.5 volts. This substantially lowers the voltage across potentiometer 136 and at slider 134 and pin 3 causing a "snap" response, since once the light illumination level incident on photocell 58 has been reached, the voltage differential between pins 2 and 3 will be increased. Also, the output at pin 6 of amplifier 130 will remain at its changed level even though the light on photocell 58 should momentarily fall below the necessary illumination to actuate amplifier 130. Thus a hysteresis action is provided to prevent intermittent output response.

In the inactive state of amplifier 132, a voltage of approximately plus 7.5 volts is applied at pin 4 and to the emitter of transistor 140. Lowering of the voltage to a minus 7.5 volts at pin 6 of amplifier 130, causes transistor 140 to conduct, thus connecting pin 4 of amplifier 132 to negative line 124. The charge present on capacitor 142 at this time determines the voltage at output pin 6 of amplifier 132 and assuming this voltage to be a plus 7.5 volts, capacitor 142 is charged through resistance 144. When capacitor 142 becomes sufficiently charged to a point at which the voltage at pin 2 of amplifier 132 exceeds the voltage at pin 3, the voltage at pin 6 will drop to a minus 7.5 volts discharging capacitor 142 and lowering the voltage at pin 2 to that below the voltage at pin 3 causing the voltage at pin 6 to change from a minus 7.5 volts to a plus 7.5 volts wherein the process will be repeated. If the voltage at pin 6 had been at a minus 7.5 volts, initially upon conduction of transistor 140, it would immediately switch to a plus 7.5 volts since the voltage at pin 2 would be lower than that at pin 3. Thus, amplifier 132 will go into oscillation regardless of the voltage on pin 6.

Amplifier 132 acts as a multivibrator with the frequency of vibration depending upon the values of resistors 144, 152 and 154 and capacitor 142. In this embodiment with component values as below, the frequency is in the order of 2,000 hertz which is in the audible range, and is capacitively coupled through capacitor 146 to output terminal 148 for driving audible devices 48 and 69, and tactile devices 62 and 99. When coil 62 is energized, it will cause housing 20 to vibrate. Also, as mentioned, earphone device 69, 86 may be used in the event a loud speaker would be distracting.

In a working embodiment of the invention, the following circuit values were used:

| Resistors | |
|---|---|
| Component | Value |
| 114 | 10K |
| 116 | 10K |
| 126 | 20K |
| 136 | 100K |
| 138 | 10K |
| 144 | 100K |
| 152 | 100K |
| 154 | 1 Meghom |
| Capacitors | |
| Component | Value |
| 142 | .001 uf. |
| 146 | .1 uf. |
| Transistors | |
| Component | Value |
| 140 | 2N3906 |
| Photocell | |
| Component | Value |
| 58 | NSL-3122 |
| Operational Amplifiers | |
| Component | Value |
| 130 | LM307 |
| 132 | LM307 |

While there have been discribed above the principles of this invention in connection with specific apparatus, it is to be clearly understood that this description is made only by way of example and not as a limitation to the scope of the invention.

What is claimed is:

1. A photo-vibratory transducer comprising:
an elongate finger supportable and manipulable housing;
photocell means being mounted in one end of said housing for sensing a predetermined energy level in the visible frequency spectrum at said one end, and for changing electrical state in response to said sensing;
sensory means being mounted in said housing for generating a discernible vibration upon actuation;
a portable power source mounted in said housing and coupled to said photocell means to provide a first signal corresponding to said change of state;
circuit means coupling said photocell means, said sensory means, and power source for energizing said sensory means upon said photocell means sensing said predetermined energy level, comparator circuit means mounted in said housing and being coupled to said source and said photocell means for receiving said first signal and for comparing said first signal with a predetermined second signal and providing an output signal upon a predetermined ratio between said first and second signals;
multivibrator circuit means mounted in said housing and being coupled to said output signal and said sensory means for generating a third signal of predetermined frequency in response to said output signal for actuating said sensory means.

2. The apparatus of claim 1 wherein said second signal in said comparator circuit means is adjustable.

3. The apparatus of claim 1 including an elongated circuit board longitudinally mounted in said housing; said comparator circuit means, said multivibrator circuit means, said power source and said sensory means being mounted on said circuit board.

4. The apparatus of claim 3 including an end piece being removably attachable to one end of said housing; said end piece when in attached relation to said housing having a surface abutting one end of said circuit board; said housing having a surface at the end opposite to said one end of said housing against which the end opposite to said one end of said circuit board abuts when said end piece is in attached relation to said one end of said housing whereby said board is firmly held in said housing when said end piece is attached to said housing.

* * * * *